United States Patent [19]

Shafer et al.

[11] Patent Number: 5,386,247

[45] Date of Patent: Jan. 31, 1995

[54] VIDEO DISPLAY HAVING PROGRESSIVELY DIMMED VIDEO IMAGES AND CONSTANT BRIGHTNESS AUXILIARY IMAGES

[75] Inventors: Kirk E. Shafer, Carmel; Aaron H. Dinwiddie, Fishers; David J. Duffield, Indianapolis, all of Ind.

[73] Assignee: Thomson Consumer Electronics, Inc., Indianapolis, Ind.

[21] Appl. No.: 71,650

[22] Filed: Jun. 2, 1993

[51] Int. Cl.[6] .......................... H04N 5/57; H04N 5/44
[52] U.S. Cl. ..................................... 348/687; 348/563; 348/569
[58] Field of Search ..................... 358/168, 39, 22 PIP, 358/169; H04N 5/57, 5/58, 5/59, 5/44, 5/445; 348/589, 569, 563, 687

[56] References Cited

U.S. PATENT DOCUMENTS 5,153,580 10/1992 Pollack ................................ 340/825
5,194,951 3/1993 Hailey et al. ......................... 358/182

FOREIGN PATENT DOCUMENTS 0038372 2/1988 Japan .
0287178 10/1988 Japan .

Primary Examiner—Victor R. Kostak
Assistant Examiner—Nathan J. Flynn
Attorney, Agent, or Firm—Joseph S. Tripoli; Peter M. Emanuel; Thomas F. Lenihan

[57] ABSTRACT

An on-screen display generator for use in an image display system is disclosed. The on-screen display generator includes a main image signal source, and an auxiliary image signal source which includes a controller for varying the perceived brightness of the image represented by the auxiliary image signal in response to a first control signal. A video signal processor, coupled to the main image signal source and the auxiliary image signal source, includes circuitry for combining the main and auxiliary image signals to produce a combined image signal. The video signal processor further includes a controller for varying the perceived brightness of the image represented by the combined image signal in response to a second control signal. A control signal generator generates the first and the second control signals in such a manner that the perceived brightness of the auxiliary image signal remains substantially constant when the perceived brightness of the main image is varied. This on-screen display generator is disclosed as being embodied in a sleep timer in a television receiver.

15 Claims, 3 Drawing Sheets

VIDEO DISPLAY HAVING PROGRESSIVELY DIMMED VIDEO IMAGES AND CONSTANT BRIGHTNESS AUXILIARY IMAGES

The present invention relates to apparatus for generating on-screen displays (OSDs) as used in image display systems, such as television receivers.

BACKGROUND OF THE INVENTION

On-screen displays have been used with image display systems, such as television receivers, to give a viewer information concerning the operation of the system. One example of a use for such on-screen displays is to display operating parameters of the system, such as the channel number to which the television receiver is tuned or a graphical representation of the sound volume level in the form of a bar graph. Such displays are generally used while the viewer is changing the associated parameter. Thus, when the viewer is changing the channel, the channel number is displayed superimposed atop the received main image, and when the viewer is changing the sound volume, the volume level bar graph is similarly displayed.

Another example of a use for such on-screen displays is in sleep timers. Sleep timers have been developed to enable a viewer to select a time when the receiver should automatically turn itself off should the viewer fall asleep, or otherwise lose interest in watching. The viewer sets the turn-off time through the use of the remote control. During the last minute or two before the receiver is to turn off, current sleep timers gradually turn down the sound volume so that a sudden change in the sound level will not awaken a sleeping viewer. In addition, current sleep timers provide an on-screen display, superimposed atop the main image, to visually indicate to the viewer that the receiver will be turning off in a short period of time. During this time interval, sleep timers are responsive to some action by a viewer, such as receipt of a signal from a remote control, to restore the volume and display of the television receiver to their normal functions. If no action is taken by a viewer during this pre-turn-off time period, then at the selected turn-off time, power is removed from the television receiver.

One on-screen display used by known sleep timers includes a textual message on the display screen indicating the amount of time (e.g. number of seconds) before the television receiver is going to turn itself off. Other on-screen displays include an iconic symbol, which may include simple animation, for example, a bar graph with a bar that gradually grows in length from one end of the on-screen display toward the other. When the bar reaches the other end of the on-screen display, the time period is over, and the receiver turns itself off. Other on-screen displays produce a black border from one or more edges of the screen. This border gradually increases in width, obscuring more and more of the image. When the border completely covers the screen, the time period is over, and the receiver turns itself off.

SUMMARY OF THE INVENTION

The present inventors have recognized that adjustment of some parameters, such as brightness and contrast, affect the overall brightness of the displayed image as perceived by the viewer (referred to below as 'perceived brightness'). If these parameters are varied in a manner to reduce the perceived brightness of the main image, then the perceived brightness of any on-screen display is also reduced.

The present inventors have further recognized that, in the case of the sleep timer on-screen display, it is desirable to gradually reduce the perceived brightness of the displayed image during the period of time before the receiver turns itself off for the same reason that the sound level is gradually reduced during that period—so a dozing viewer is not disturbed by a sudden change in light level. However, as described above, if the perceived brightness of the displayed image is reduced, then the perceived brightness of the on-screen display is similarly reduced.

It was found desirable that the perceived brightness of the on-screen display remain relatively constant, regardless of the perceived brightness of the displayed image. This was found especially desirable in a sleep timer when the perceived brightness of the main image is automatically gradually reduced during the time period before the receiver turns itself off. Such operation of on-screen displays gives the advantage that an on-screen display is always visible regardless of the perceived brightness of the main image as set by the user or by the operation of the sleep timer in the pre-turn-off period.

In accordance with principles of the present invention, apparatus for displaying an on-screen display on an image display system comprises a main image signal source, and an auxiliary image signal source including a control circuit for varying the perceived brightness of the image represented by the auxiliary image signal in response to a first control signal. A video signal processor, coupled to the main image signal source and the auxiliary image signal source, includes circuitry for combining the main and auxiliary image signals to produce a combined image signal. The video signal processor further includes a control circuit for varying the perceived brightness of the image represented by the combined image signal in response to a second control signal. A control signal generator generates the first and the second control signals in such a manner that the perceived brightness of the image represented by the auxiliary image signal remains substantially constant when the perceived brightness of the main image is varied.

DETAILED DESCRIPTION OF THE DRAWING

Figure 1:
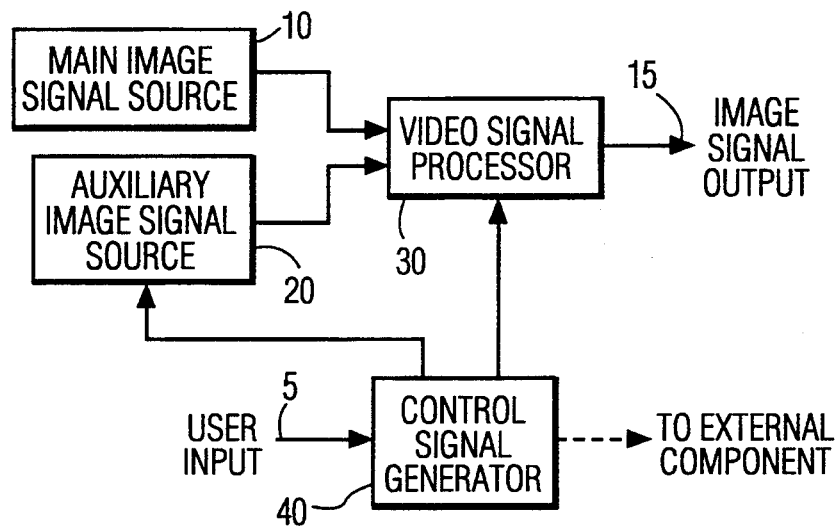
FIG. 1 is a block diagram of a portion of an image display system including an on-screen display circuit in accordance with principles of the present invention.

FIG. 1 is a block diagram of a portion of an image display system including an on-screen display circuit in accordance with principles of the present invention. The present invention will be described below, and illustrated in the drawing, as a portion of a sleep timer circuit embodied in a television receiver. Such a sleep timer circuit includes elements other than those illustrated in FIGS. 1 and 4. However, those other elements, and their arrangement and operation, are known and are not germane to the present invention. In order to simplify the drawing and associated description, those elements have not been illustrated, and will not be described in detail. In addition, although single signal lines have been illustrated coupling the various blocks, the illustrated lines may actually represent multiple signal paths.

In FIG. 1, a main image signal source 10 has an output terminal coupled to a first signal input terminal of a video signal processor 30. An auxiliary image signal source 20 has an output terminal coupled to a second signal input terminal of video signal processor 30. Video signal processor 30 has an output terminal coupled to an image signal output terminal 15. Output signal terminal 15 is coupled to utilization circuitry (not shown) for displaying the image represented by the signal from video signal processor 30. A user input terminal 5 is responsive to input from a user of the display system, and may, for example, include a remote control link (not shown) with the user. User input terminal 5 is coupled to an input terminal of a control signal generator 40. A first output terminal of control signal generator 40 is coupled to a control input terminal of the auxiliary image signal source 20 and a second output terminal of control signal generator 40 is coupled to a control input terminal of video signal processor 30.

In operation, a user supplies a desired turn-off time for the display system to the control signal generator 40 through the user input terminal 5. This time may be expressed either as a time of day (e.g. 1:00 am) or a period of time from the present (e.g. 2 hours from now). As described above, input from the user may be received via a remote control link. In addition, control signal generator 40 may supply control signals to the video signal processor 30 causing the video signal processor 30 to produce on-screen instructions to guide the user in the proper setting of the turn-off time. The receipt of the turn-off time from the user, and the use of the display device to supply instructions is known, and will not be described in more detail.

After a turn-off time has been selected by the user, control signal generator 40 supplies control signals to the video signal processor 30 causing the main image signal from the main image signal source 10 to be processed in a normal manner by video signal processor 30 and a corresponding image representative signal to be produced at image signal output terminal 15. As described above, the sleep timer illustrated in the drawing is embodied in a television receiver, thus, the main image signal source 10 includes an RF tuner, video IF amplifiers and video detectors. The sleep timer may, however, be embodied in other components of an image display system, such as a video monitor, video cassette recorder (VCR), laser video disk player or cable decoder box. In such cases, the main image signal source 10 includes the circuitry required to produce an image signal representing a main image. For example, in a VCR, the main image signal source 10 includes a tape transport mechanism, tape heads, and playback amplifiers.

The illustrated video signal processor 30 includes a signal path consisting of luminance and chrominance signal separation filters and processing circuits, kinescope driver amplifiers, sync separators and deflection signal generators. This signal path produces signals which, when supplied to a kinescope and deflection apparatus, cause the image represented by the main image signal to be displayed on the kinescope screen. The illustrated video signal processor 30 also includes various control circuits for varying characteristics of the displayed image, such as brightness, contrast, tint and color control circuits. These control circuits are responsive to control signals generated in response to user input via the remote control link. This circuitry is well known and will not be described in detail.

Video signal processor 30 further includes circuitry to selectively combine the signal from the auxiliary image signal source 20 with the signal from the main image signal source 10, to produce a combined image signal, in response to a control signal from control signal generator 40. If enabled by this control signal, the combined image signal is supplied to the signal path of the video signal processor 30 described above. Otherwise only the signal from the main image signal source 10 is supplied to the signal path of the video signal processor 30.

Control signal generator 40 monitors the current time. At some predetermined period of time before the selected turn-off time, for example one to two minutes, control signal generator 40 enters a pre-turn-off operational mode. In the pre-turn-off operational mode, control signal generator 40 supplies the control signal, described above, to the video signal processor 30 causing the video signal processor 30 to combine the image signals from the main image signal source 10 and auxiliary image signal source 20 and to produce a signal at image signal output terminal 15 representing the combination of the images represented by the main and auxiliary image signals.

The auxiliary image signal source 20 produces a video signal representing the on-screen display used to inform the user that the receiver will be turning itself off in a short period of time. In a preferred embodiment, the on-screen display includes a textual indication of the number of seconds before the receiver is to turn off, and an animation of sheep running across the bottom of the display screen, to represent the well-known "counting sheep" expression. Circuitry to produce such an animation video signal, and the synchronization and combination of such a signal with a main image signal, is well known, and will not be described in detail.

Also in the pre-turn-off operational mode, the perceived brightness of the displayed image is gradually reduced. In a preferred embodiment, the control signal generator 40 supplies a control signal to the contrast control circuit (described above) in the signal path of the video signal processor 30 to gradually reduce the contrast of the combined image by reducing the gain of the combined image signal. At the same time, the perceived brightness of the on-screen display is gradually increased. In the preferred embodiment, another control signal is supplied by the control signal generator 40 to a contrast control circuit in the auxiliary image signal source 20 to gradually increase the contrast of the on-screen display by increasing the gain of the image signal from the auxiliary image signal source 20. These control signals are generated in such a manner that the contrast of the on-screen display image is increased at a rate which compensates for the rate of decrease in contrast of the combined image. As a result, the image represented by the main image signal appears to fade out, while the on-screen display image, represented by the auxiliary image signal, remains at a substantially constant perceived brightness.

Figure 2A:
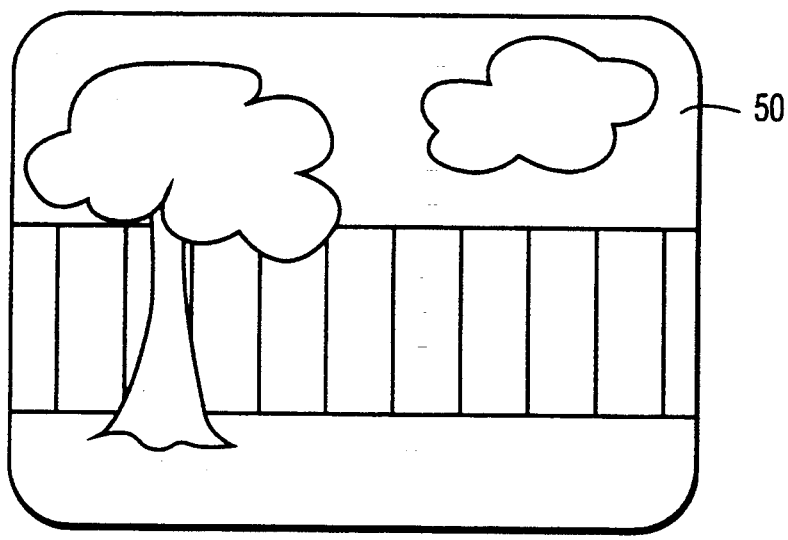
FIGS. 2a to 2c are screen displays generated by an image display system including the on-screen display circuit illustrated in FIG. 1.
Figure 2B:
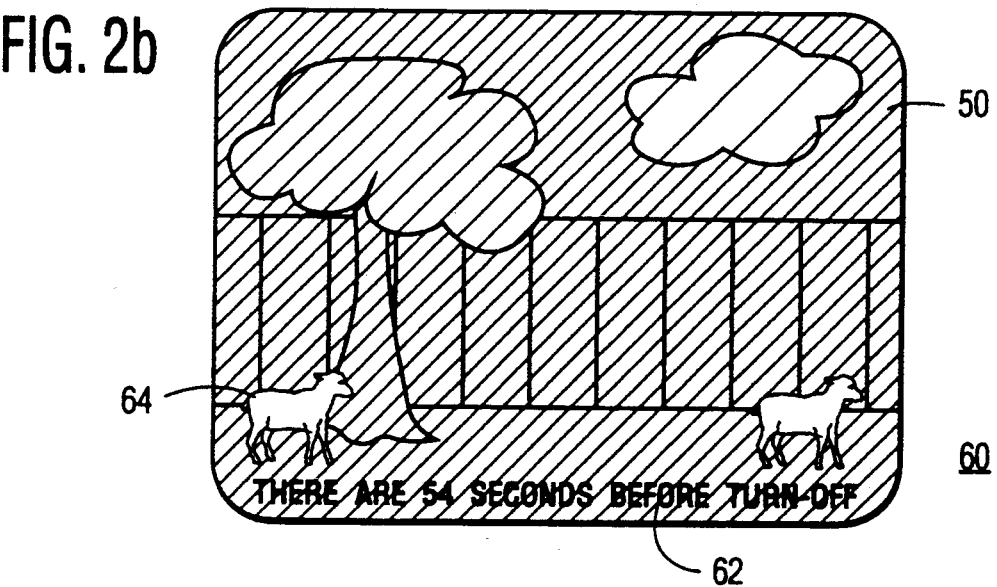
Figure 2C:
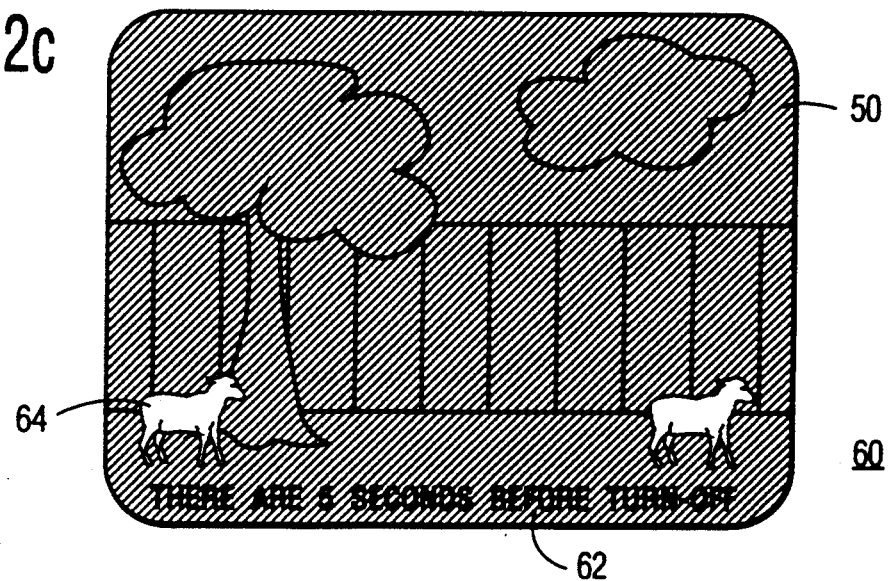

This effect may be understood by reference to FIGS. 2a through 2c. FIG. 2a illustrates a screen display during the normal operational mode. The screen display of FIG. 2a consists of a main image 50 of a tree in front of a fence with a cloud in the sky. In FIG. 2a, the screen display is at normal contrast and brightness, as set by a viewer. FIG. 2b illustrates a screen display near the beginning of the pre-turn-off time period when the control signal generator 40 has entered the pre-turn-off operational mode. The screen display of FIG. 2b consists of the main image 50, and the on-screen display 60. The on-screen display image 60 is at the bottom of the screen and consists of a textual message 62, "There are 54 seconds before turn-off", and an animated image 64 of sheep running across the bottom of the screen.

In FIG. 2b, the control signal generator 40 (of FIG. 1) has generated the control signal necessary to begin to decrease the contrast of the main image 50, and the main image 50 is correspondingly darker. However, control signal generator 40 also has generated the control signal necessary to increase the contrast of the on-screen display 60. Thus, the on-screen display 60 of the textual message 62 and the animated sheep 64 remains at full contrast and brightness, as can be seen in FIG. 2b. FIG. 2c illustrates a screen display near the end of the pre-turn-off time period. The control signal generator 40 has caused the main image 50 to be nearly blacked out. However, the contrast of the on-screen display image 60 has been increased so that the textual message 62 and animated sheep 64 still remain at full contrast and brightness.

Figure 3A:
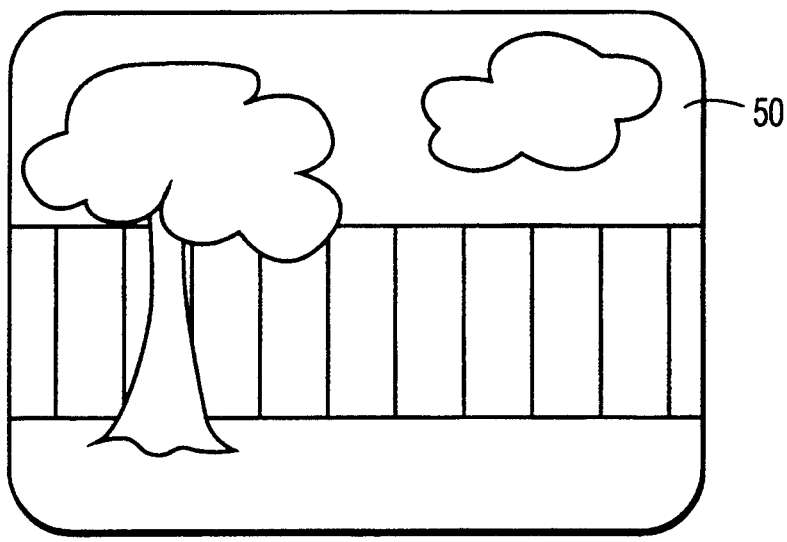
FIGS. 3a to 3c are screen displays generated by an image display system including a second embodiment of the on-screen display circuit illustrated in FIG. 1.
Figure 3B:
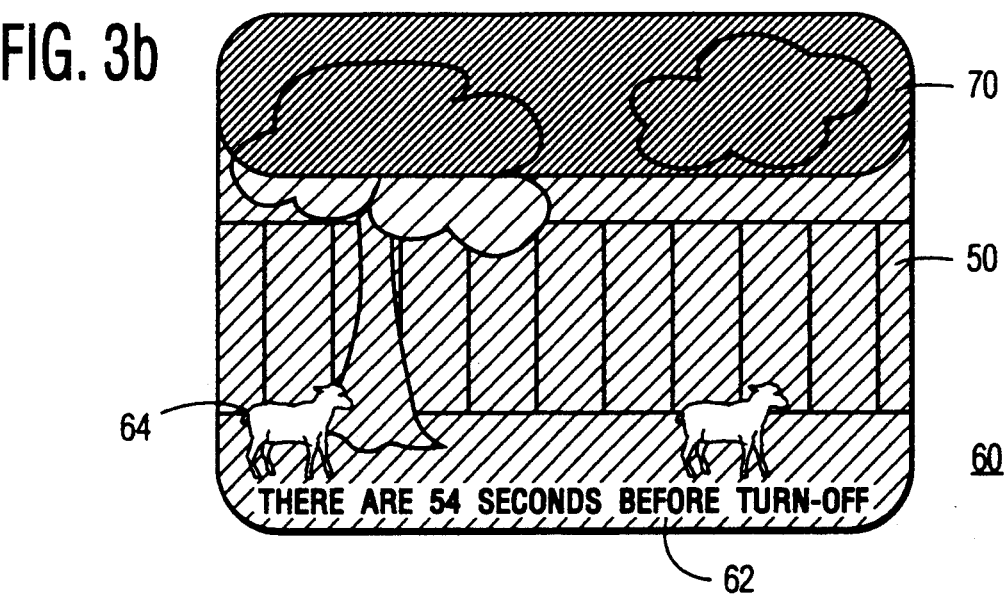
Figure 3C:
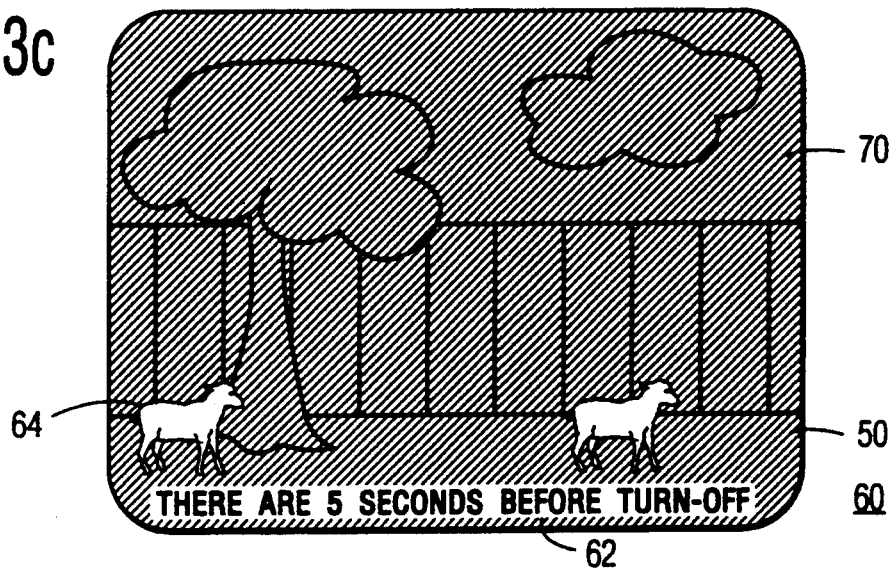

An alternative embodiment is illustrated in FIGS. 3a to 3c. FIG. 3a is the same as FIG. 2a, and illustrates a screen display during the normal operational mode. The screen display of FIG. 3a consists of a main image 50 of a tree in front of a fence with a cloud in the sky. In FIG. 3a, the screen display is at full contrast and brightness. FIG. 3b illustrates a screen display near the beginning of the pre-turn-off time period when the control signal generator 40 has entered the pre-turn-off operational mode. As in FIG. 2b, the screen display of FIG. 3b consists of the main image 50, and the on-screen display 60. The on-screen display image 60 is at the bottom of the screen and consists of a textual message 62, "There are 54 seconds before turn-off", and an animated image 64 of sheep running across the bottom of the screen. As before, the control signal generator 40 (of FIG. 1) has generated the control signal necessary to begin to decrease the contrast of the main image 50, and the main image 50 is correspondingly darker. Also as before, control signal generator 40 also has generated the control signal necessary to increase the contrast of the on-screen display 60. Thus, the on-screen display 60 of the textual message 62 and the animated sheep 64 remains at full contrast and brightness, as can be seen in FIG. 3b. In addition, this embodiment includes a black margin 70 which begins at the top edge of the screen display and gradually widens, dropping on the image, like a descending curtain.

FIG. 3c illustrates a screen display near the end of the pre-turn-off time period. The control signal generator 40 has caused the main image 50 to be nearly blacked out. However, the contrast of the on-screen display image 60 has been increased so that the textual message 62 and animated sheep 64 still remain at full contrast and brightness. In addition, the margin 70 has dropped to the top of the on-screen display image 60. The margin will not widen to the extent that it obscures the on-screen display 60, but instead stops at the top of the on-screen display so that the on-screen display remains visible until the receiver turns itself off.

At the end of the pre-turn-off period (illustrated in FIGS. 2 and 3), control signal generator 40 (of FIG. 1) sends a further control signal (power supply control signal) to the power supply the reference numeral 125 for the television receiver which causes the power supply to turn off, turning off the receiver. The control signals and power supply circuitry necessary to perform the power turn-off are well known, are not illustrated and will not be described in detail.

It is also possible for such a sleep timer to turn off power to all the electronic equipment forming the image display system. For example, each piece of electronic equipment in the image display system could be equipped with known X-10 power control circuitry, or a CE-bus interface. In such an image display system, control signal generator 40 (of FIG. 1) would provide a control signal to an X-10 or CE-bus signal transmitter in its own equipment. This control signal would cause the X-10 or CE-bus signal transmitter to send the signals necessary to remove power from all the other pieces of electronic equipment forming the image display system.

For example, if the pieces of equipment in the image display system were equipped with X-10 power control circuits, and the sleep timer were embodied in a VCR, the control signal generator in the VCR would generate the necessary control signals to cause the image signal processing circuitry in the VCR to provide the combined image representative signal at its video or RF output terminal during the pre-turn-off time period. The combined image signal would be generated with the perceived brightness of the main image gradually reduced and the perceived brightness of the on-screen display maintained substantially constant, as described above. When the turn-off time arrives, a signal is transmitted from the X-10 transmitter in the VCR to turn off the attached monitor or television receiver. Then the VCR turns itself off.

Figure 4:
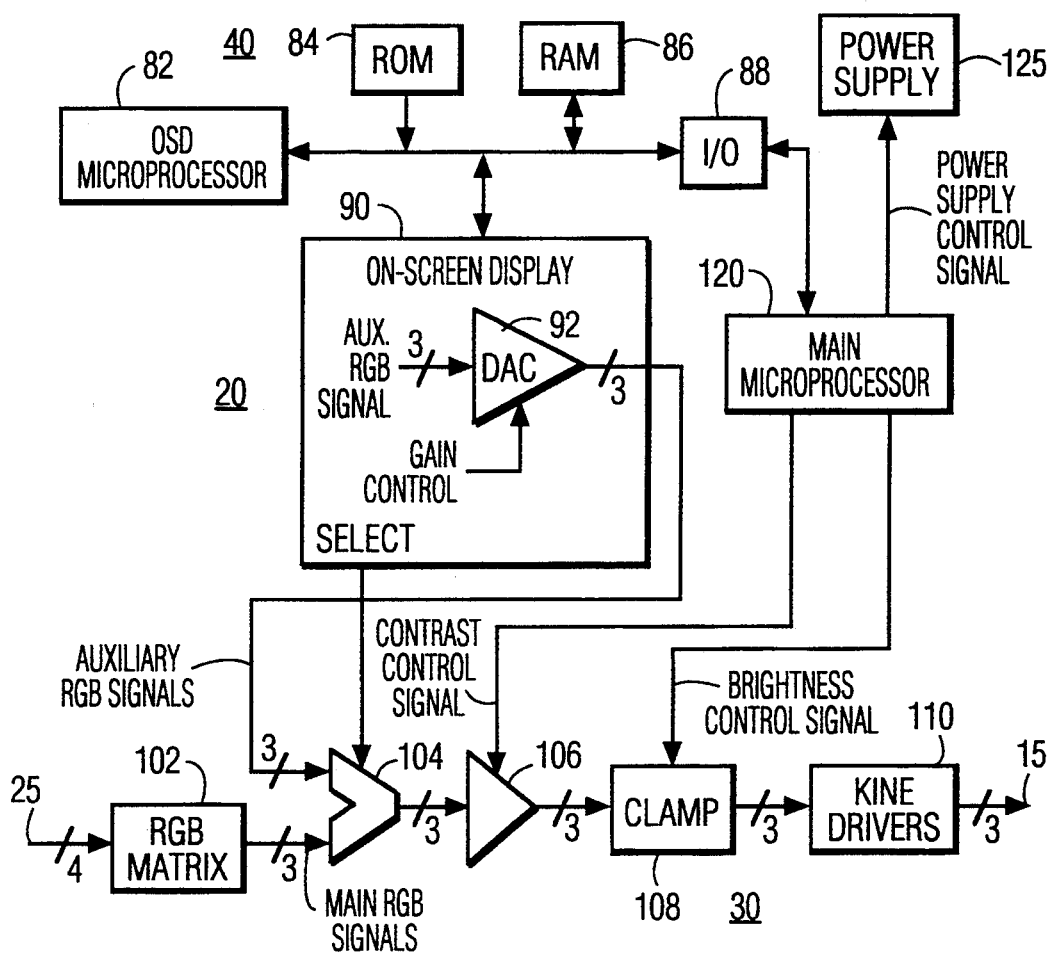
FIG. 4 is a more detailed block diagram of the on-screen display circuit illustrated in FIG. 1.

FIG. 4 is a more detailed block diagram of the sleep timer circuit illustrated in FIG. 1. In FIG. 4, elements corresponding to those in FIG. 1 are designated by the same number and are not described in detail below.

The bottom portion of FIG. 4 illustrates a portion of the signal path of video signal processor 30 (of FIG. 1). An input terminal 25 is coupled to preceding video signal processing circuitry (not shown) of video signal processor 30. The preceding video signal processing circuitry produces a luminance component (Y) and three color difference components (R-Y, G-Y and B-Y), representing the image signal from the main image signal source 10 (of FIG. 1), in a known manner. Input terminal 25 is coupled to an input terminal of an RGB matrix 102, which produces three color signals (R, G and B) representing the main image signal. An output terminal of RGB matrix 102 is coupled to a first signal input terminal of a multiplexer 104. A signal output terminal of multiplexer 104 is coupled to a signal input terminal of variable gain amplifier 106. An output terminal of variable gain amplifier 106 is coupled to a signal input terminal of clamping circuit 108. An output terminal of clamping circuit 108 is coupled to an input terminal of kine driver circuit 110, and an output terminal of kine driver circuit 110 is coupled to the kinescope (not shown) of the television receiver. This portion of the data path is arranged in a known manner and is embodied in an integrated circuit model TA 7730 P manufactured by Toshiba Corporation.

A main microprocessor 120, receives inputs (not shown) from the user and generates control signals for controlling the operation of the television receiver, such as power-on and off, and channel number (not shown), and for varying different characteristics of the received composite television signal, such as sound volume (also not shown), in a known manner. Two such control signals are illustrated in FIG. 4, a contrast control signal and a brightness control signal. These control signals are generated in response to input from the user, either from user accessible controls physically located on the front panel of the television receiver, or via the remote control link. The contrast control signal is coupled to a control input terminal of the variable gain amplifier 106, and the brightness control signal is coupled to a control input terminal of clamping circuit 108.

An on-screen display (OSD) microprocessor 82 is coupled to a read only memory (ROM) 84, a read/write memory (RAM) 86 and an input/output (I/O) controller 88 through a microprocessor bus 85. The combination of the OSD microprocessor 82, ROM 84, RAM 86 and I/O controller 88 form a portion of the control signal generator 40 (of FIG. 1). A bidirectional terminal of I/O controller 88 is coupled to a corresponding terminal of the main microprocessor 120. An on-screen display generator 90 is also coupled to the OSD microprocessor 82 through the microprocessor bus 85. On-screen display generator 90, in combination with the OSD microprocessor 82, forms the auxiliary image signal source 20 (of FIG. 1), and generates an auxiliary image signal representing the on-screen display 60 (of FIGS. 2 and 3). On-screen display generator 90 also generates a bilevel select signal which has a first state when pixels representing the on-screen display image are being displayed, and a second state otherwise. The select signal is coupled to a control input terminal of multiplexer 104.

The on-screen display generator 90 includes circuitry for generating red, green and blue (RGB) signals representing the on-screen display image 60 (of FIGS. 2 and 3). Because the on-screen display RGB signals are generated digitally within the on-screen display generator 90, the last processing circuit in the on-screen display generator 90 is a digital-to-analog converter (DAC) 92. A signal input terminal of DAC 92 is coupled to digital circuitry (not shown) generating digital R, G and B signals representing the on-screen display. An output terminal of DAC 92 is coupled to a second signal input terminal of multiplexer 104. DAC 92 is of a known type which allows a gain adjustment of the analog output signal. OSD microprocessor 82 provides a gain control signal to DAC 92 which sets the gain of DAC 92. This gain adjustment of the analog on-screen display RGB signals is equivalent to an adjustment of the contrast of the image represented by the on-screen display RGB signals.

In operation, main microprocessor 120 monitors inputs from the user, and, as described above, generates signals for controlling the different parameters of the composite television signal: sound volume, channel number, contrast, brightness, etc. When an on-screen display is to be displayed in conjunction with user input, e.g. display of the current channel number during channel selection, or the sound volume bar graph during sound volume adjustment, a message is sent from the main microprocessor 120 to the OSD microprocessor 82 via the I/O controller 88.

The OSD microprocessor 82 executes programs stored in ROM 84, stores and retrieves data from RAM 86 and communicates with the main microprocessor 120 via I/O controller 88. In response to the above message from the main microprocessor 120, OSD microprocessor 82, causes on-screen display generator 90 to generate the appropriate on-screen display image, and supply it to multiplexer 104 in the main signal path of the video signal processor 30. This operation is well known and will not be described in detail.

In accordance with principles of the present invention, the OSD microprocessor 82 monitors any changes to parameters which affect the perceived brightness of the main image, e.g. contrast and/or brightness. If a change to such a parameter is indicated, then the OSD microprocessor 82 causes the on-screen display generator 90 to change the perceived brightness of the on-screen display 60 to compensate for the indicated change. In this manner, the perceived brightness of all on-screen displays remain substantially constant regardless of any adjustments made by a user.

In the illustrated embodiment, changes made by the user to the contrast (or gain) of the main image signal are monitored, and the gain of the DAC 92 of on-screen display generator 90 is varied (varying the contrast of the on-screen display) to compensate for the changes in contrast. It is also possible that changes made by the user to the brightness (or DC level) of the main image signal be monitored. In this case the DC level (or brightness) of the on-screen display image signal would be changed to compensate for changes to the brightness of the main image signal.

During sleep timer operations, there are no messages from the main microprocessor 120 to the OSD microprocessor 82. Instead, OSD microprocessor 82 monitors the current time and the desired sleep time set by the user, and during the pre-turn-off time period, controls the generation of the on-screen display image and generates the required control signals to gradually reduce the perceived brightness of the main image while maintaining the perceived brightness of the on-screen display substantially constant.

At the onset of the pre-turn-off time period, OSD microprocessor 82 sends control signals to the on-screen display generator 90 to cause it to generate the display of the textual message 62 (of FIGS. 2 and 3) at the bottom of the screen, and continuously updates the message so that the proper time is always displayed in that message. In addition, the on-screen display generator 90 is controlled to generate the animated sheep display 64. In the alternate embodiment, illustrated in FIG. 3, the on-screen display generator 90 further generates the descending black curtain 70 as well. The RGB signals produced by DAC 92 represent the on-screen display 60. The select signal from the on-screen display generator 90 causes multiplexer 104 to couple the auxiliary RGB signal to its output terminal when pixels representing the on-screen display image 60 (of FIGS. 2 and 3) are being produced by on-screen display generator 90, and to couple the main RGB signal to its output terminal otherwise. The on-screen display is generated in a known manner by the cooperation of the OSD microprocessor 82 and the on-screen display generator 90, and the generation process will not be described in detail.

Also during the pre-turn-off time period, OSD microprocessor 82 repeatedly sends messages via I/O controller 88 to the main microprocessor 120. In response to these signals, the main microprocessor 120 reduces the contrast of the main image RGB signal by reducing the gain of the gain control amplifier 106 in the same manner as if a user had requested decreased contrast via the receiver front panel or the remote control link. Simultaneously, OSD microprocessor 82 generates signals causing the on-screen display generator 90 to correspondingly increase the gain of the on-screen display RGB signals by increasing the gain of DAC 92. During the time when pixels representing the on-screen display image 60 are being displayed, the serial connection of the variable gain DAC 92 and the variable gain amplifier 106 is coupled to the kinescope. As the gain of the variable gain amplifier 106 is decreased, the gain of the DAC 92 is increased in the correct proportion to maintain the total gain of the serial connection substantially constant. In this manner the on-screen display 60 is always bright enough for a user to see, regardless of how dark the main image becomes.

FIGS. 2 and 3 illustrate a textual message and two animated sheep running across the bottom of the screen. It is also possible for more or less than two sheep to be seen on the display screen at the same time, or for another animated image to be displayed. It is also possible that each sheep display on its back the number of seconds remaining before turn-off, in place of the textual message. It is also possible for other animation to be generated, such as having the sheep jump over a fence.

In addition, in the illustrated embodiment, the power supply for the receiver was described as being completely turned off, however, there may be a standby power supply which is always connected to selected circuits in the receiver, such as those circuits powering the remote control receiver, and that only the main operating power supply is turned off.

APPENDIX

The following is a code fragment in the C language representing a portion of the code executed by the OSD microprocessor 82 (of FIG. 4) during operation of the sleep timer during the pre-turn-off period of time.

```
void DropSheepCurtain(void)           /*gradually lower black *nightfall* curtain (margin) over sheep */
{                                     /*and drop video contrast while increasing OSD contrast*/
    i=GetTopMargin();                 /*get current top margin setting*/
    If(((I%2)==0) && (o_>DA != 0Xff)) /*every other margin click, tweak up OSD intensity one click*/
    {
        o->DA++;                      /*increment OSD contrast level one click*/
    }
    If(((I%4)==0) && (da_contrast !=0)) /*every 4th margin click, tweak down contrast one click*/
    {                                 /*video contrast gradations not same scale as OSD contrast*/
        da_contrast-;                 /*decrement the video contrast level variable one click*/
        SetValue(CONTRASTt,da_contrast); /*set the contrast level of the video
    }
    If(I<margin_stop) {I++;}          /*if not reached top of sheep's head, then lower margin 1 more*/
                                      /*scan line*/
    SetTopMargin(I);                  /*set top black margin vertical position*/
}
```

What we claim is:

1. Apparatus for generating an on-screen display in an image display system, comprising:
   a main image signal source;
   an auxiliary image signal source, including circuitry for varying the perceived brightness of the image represented by the auxiliary image signal in response to a first control signal;
   a video signal processor, coupled to the main image signal source and the auxiliary image signal source, and including circuitry for combining the main image signal and the auxiliary image signal to produce a combined image signal, and circuitry for varying the perceived brightness of the image represented by the combined image signal in response to a second control signal; and
   a control signal generator for generating the first and the second control signals so that the perceived brightness of the image represented by the auxiliary image signal remains substantially constant when the perceived brightness of the main image signal is varied, said first and second control signals varying inversely to one another.

2. Apparatus for automatically removing operating power from a component of an image display system, comprising:
   a main image signal source;
   an auxiliary image signal source, including circuitry for varying the perceived brightness of the image represented by the auxiliary image signal in response to a first control signal;
   a video signal processor, coupled to the main image signal source and the auxiliary image signal source, and including circuitry for combining the main image signal and the auxiliary image signal to produce a combined image signal, and circuitry for varying the perceived brightness of the image represented by the combined image signal in response to a second control signal; and
   a control signal generator, responsive to input from a user selecting a time when operating power is to be removed from the component, for generating the first and the second control signals so that the perceived brightness of the image represented by the main image signal is gradually reduced while the perceived brightness of the image represented by the auxiliary image signal remains substantially constant during a predetermined period of time before the selected time, and for generating a signal to control removing the operating power from the component at the selected time, said first and second control signals varying inversely to one another.

3. The apparatus of claim 1, wherein:
   the varying circuitry in the auxiliary image signal source comprises a first gain control circuit responsive to the first control signal; and
   the varying circuitry in the video signal processor comprises a second gain control circuit responsive to the second control signal.

4. The apparatus of claim 3, wherein
the control signal generator generates the first and second control signals such that the serial gain of the first and second gain control circuits remains substantially constant.

5. The apparatus of claim 3, wherein:
the auxiliary image signal source comprises digital circuitry for generating a digital signal representing the auxiliary image signal; and
the first gain control circuit comprises a digital to analog converter, producing an analog output signal having a variable gain controlled by the first control signal, and responsive to the digital auxiliary image signal representative signal.

6. The apparatus of claim 1, wherein the combining circuitry in the video signal processor comprises a two input multiplexer.

7. The apparatus of claim 1, wherein the control signal generator generates the second control signal in response to a user input.

8. The apparatus of claim 1 wherein the control signal generator comprises:
a first processor for generating the first control signal; and
a second processor, coupled to the first processor, and responsive to a user input, for generating the second control signal.

9. The apparatus of claim 8, wherein the component comprises the control signal generator, and the operating power controlling signal is coupled to a main operating power supply for the component.

10. The apparatus of claim 2, wherein the component is located remotely from the control signal generator, and the operating power controlling signal is made available to the component through a remote signal link.

11. The apparatus of claim 2, wherein:
the varying circuitry in the auxiliary image signal source comprises a first gain control circuit responsive to the first control signal; and
the varying circuitry in the video signal processor comprises a second gain control circuit responsive to the second control signal.

12. The apparatus of claim 11, wherein the control signal generator generates the first and second control signals such that the serial gain of the first and second gain control circuits remains substantially constant.

13. The apparatus of claim 11, wherein:
the auxiliary image signal source comprises digital circuitry for generating a digital signal representing the auxiliary image signal; and
the first gain control circuit comprises a digital to analog converter, producing an analog output signal having a variable gain controlled by the first control signal, and responsive to the digital auxiliary image signal representative signal.

14. The apparatus of claim 2, wherein the combining circuitry in the video signal processor comprises a two input multiplexer.

15. The apparatus of claim 2, wherein the control signal generator comprises:
a first processor for generating the first control signal; and
a second processor, coupled to the first processor, and responsive to the user input, for generating the second control signal and the operating power controlling signal.

* * * * *